US000001259H

United States Statutory Invention Registration [19]

[11] Reg. Number: H1259

[43] Published: Dec. 7, 1993

Aggarwal et al.

[54] LARGE FLUORIDE GLASS PREFORM FABRICATION

[76] Inventors: Ishwar D. Aggarwal, 9810 Viewcrest Dr., Fairfax Station, Va. 22039; Daniel Brower, 12716 Hillmeade Station Dr., Bowie, Md. 20720; Grant Lu, 237 South St. #27, Shrewsbury, Mass. 01545

[21] Appl. No.: 589,753

[22] Filed: Sep. 28, 1990

[51] Int. Cl.[5] ..... C03C 25/02

[52] U.S. Cl. ..... 65/3.11; 65/8; 65/DIG. 16; 65/60.5

[58] Field of Search ..... 65/3.11, 8, DIG. 16, 65/110, 122, 71, 3.2, 66, 32.4, 60.5, 60.7, 1; 501/37, 40, 904

[56] References Cited

U.S. PATENT DOCUMENTS

| | | | |
|---|---|---|---|
| 4,519,826 | 5/1985 | Tran | 65/3.11 |
| 4,729,777 | 3/1988 | Mimura et al. | 65/3.13 |
| 4,838,919 | 6/1989 | Kunkle | 65/3.11 |
| 4,842,627 | 6/1989 | Schneider | 65/3.11 |
| 5,055,120 | 10/1991 | Tran et al. | 65/DIG. 16 |

FOREIGN PATENT DOCUMENTS

| | | | |
|---|---|---|---|
| 0183332 | 11/1982 | Japan | 65/DIG. 16 |

OTHER PUBLICATIONS

Kingery et al, *Introduction to Ceramics,* 1976, 2nd ed. p. 760.

"Properties of Corning's Glass and Glass Ceramic Families," 1979 pp. 16 and 19.

Kingery et al., *Introduction to Ceramics,* 1976, 2nd ed., pp. 92–93, 833–834, Wiley & Sons, Inc.

*Primary Examiner*—Robert L. Stoll
*Assistant Examiner*—Joseph D. Anthony

[57] ABSTRACT

A process for producing long length fluoride glass preforms, by producing a fluoride glass rod of core glass, overcoating the core glass rod with fluoride cladding glass to form a core/clad unit, and overcoating the core/clad unit with an oxide glass overclad.

32 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LARGE FLUORIDE GLASS PREFORM FABRICATION

BACKGROUND OF THE INVENTION

This invention relates generally to optical fibers, and more specifically to fluoride glass preforms from which long-length fibers can be drawn.

Optical waveguides have been known and used for some time. Optical waveguides may be employed, for example, in communications. There are three basic types of optical waveguides used in communications. For communications over relatively short distances, multimode, stepped index profile waveguides are used. These waveguides are generally used in conjunction with an incoherent light source such as an LED. For very long distance, high capacity communication systems, a single mode type waveguide is used. The single mode type waveguide supports propagation of only one mode due to a small diameter of the core. A solid state laser is usually the light source used with these fibers since it is one of the light sources capable of launching sufficient power into the single propagating mode. For intermediate distance applications, multimode fibers with a graded index profile are used. Pulse broadening, resulting from variation in path length of the various modes of light propagating down the waveguide, is reduced with a graded index profile as compared to the stepped index multimode fiber. Because of increasing interest in the infrared, fluoride glass fibers are of especial interest because of their exceptional response to infrared frequencies. The term fluoride glass is one known to those skilled in this art as any of a number of vitreous compounds of fluorine with the so called ZBLANs, e.g. zirconium, barium, lanthanum, aluminum, sodium, lead, gallium, lithium, etc.

Optical fibers are drawn from a core rod preform. To achieve drawn fibers without optical defects, it is necessary that the core rod preform from which the fibers are drawn is free from defects. Various methods have been proposed for making core rod preforms.

U.S. Pat. No. 4,519,826 to Tran discloses a method of making optical fibers having a fluoride glass cladding. Cladding glass is poured into a thermally-conductive, vertically disposed rotating mold. The mold is rotated about its vertical axis to allow the cladding class to coat the bore surface of the mold. The mold is then rapidly changed to a horizontal position while continuing rotation. The centrifugal force from rotation causes the mold to uniformly coat the bore surface of the mold. Rotation is continued until the temperature of the fluoride cladding glass approaches about the temperature of the mold, thus forming a cladding tube. Core glass melt may then be introduced into the cladding tube, forming a preform. The preform may then be drawn into an optical fiber.

In the traditional methods, difficulties are encountered in making a large-sized preform in which a long fiber may be drawn. The preform obtained in the past is usually about 10 mm in diameter and 100 mm or so in length. In practice, the actual length of the preform that can be used is even smaller. The length of a fiber which can be drawn out of the conventionally-made preforms is about 500 m at most. The primary reason for the difficulty in the manufacture of a large-sized preform rod by the conventional methods is that gas bubbles become trapped in the core glass melt when the latter is poured into the clad glass tube. In other words, when the core glass melt is poured into the clad glass tube, gas will remain as bubbles in the glass because of no escape for the gas in the cladding glass tube. As the cladding glass tube becomes longer and the core diameter becomes smaller, the core glass will further block gas escape, so gas bubbles will be more likely to remain in the preform rod.

A further problem with the conventional methods involves tensile strength of the fiber drawn out of the preform produced. The strength of a fiber is reduced by the scratches on the fiber surface. These scratches originate from those already present in the surface of the preform. With conventional manufacturing methods such as Tran's, the inner diameter surface of the cladding tube inevitably becomes uneven, requiring polishing before polishing of the core glass. The polishing leaves a number of scratches about the tube's inner diameter, with the result that the strength of the fiber drawn out of such a preform will also diminish.

A further problem associated with the conventional methods which initially form a clad glass tube is that heat is difficult to remove from the core glass melt as it is poured into the clad glass tube. Heat transfer is hindered by the clad glass tube. Heat removal is necessary to form a large fluoride glass preform. Heat transfer must be sufficiently quick to prevent crystallization of fluoride glass when the molten form is poured into the mold and solidifies therein. The quicker one can controllably remove heat without such crystallization, the larger one can make the preforms, and hence the more fiber one can draw.

SUMMARY OF THE INVENTION

It is a primary object of the invention to overcome the shortcomings of the prior art.

It is an object of the invention to produce fluoride glass preforms which can be drawn into long-length optical fibers.

It is another object of the invention to provide a method for producing fluoride glass preforms having fewer defects than in the prior art methods.

Another object is to reduce bubbles trapped in the glass while making the preform.

Another object is to increase the rate at which heat can be removed from the core and clad during formation of the preform.

Another object is to increase the tensile strength of the preform and the optical fibers drawn from the preform by making both the core and clad in smooth, regular, from so as to eliminate the need to polish them.

In accordance with these and other objects made apparent hereinafter, the invention is a method of producing a preform drawable into an optical fiber. The method comprises pouring molten glass into a first mold to form a core rod, placing the core into a second mold having an inner diameter greater than the outer diameter of the core rod, and pouring molten glass into the second mold to form a cladding about the core.

By forming the core first, and pouring the cladding glass thereafter, rather than the reverse as in the Tran method mentioned above, heat is removed after each pouring directly through the mold, with no intermediate glass layer to slow heat removal. (In the Tran method, heat from the core must pass through the earlier poured cladding.) Because the core is formed apart from the clad, and formed prior to it, gas bubbles will not be trapped in the core as in the Tran method. This is impossible in the Tran method because the core is formed by pouring molten core glass into an existing tube of cladding glass.

Moreover, by using separate molds to form the core and clad, both the core and clad take the regular and smooth shape of the molds. One therefore need not polish either, as one must polish the cladding tube in the Tran method. By eliminating polishing, and thus polishing scratches, the fibers according to the invention have increased tensile strength.

Additionally, one can place the core/clad preform into a third mold having an inner diameter larger than the outer diameter of the preform, and pour a jacketing material into the third mold to form an over clad on the preform. The over clad forms a protective coating for the core/clad preform unit, and the optical fiber drawn from it.

BRIEF DESCRIPTION OF THE DRAWINGS

A more complete understanding of the invention can be obtained by reference to the accompanying figures wherein.

DESCRIPTION OF PREFERRED EMBODIMENTS

In its preferred form, the process of the present invention involves three primary steps:

(1) production of a glass rod of core glass;

(2) overcoating of this core glass rod with cladding glass to form a core/clad unit; and, optionally;

(3) overcoating of the core/clad unit with a protective glass overclad.

The embodiments set forth hereinafter concern fluoride glasses. This is so because of the great interest in developing optical devices for use in the infrared, to which fluoride glass is especially suited. However, the invention in its broadest scope pertains to the making of glass optical fibers generally.

Figure 1:
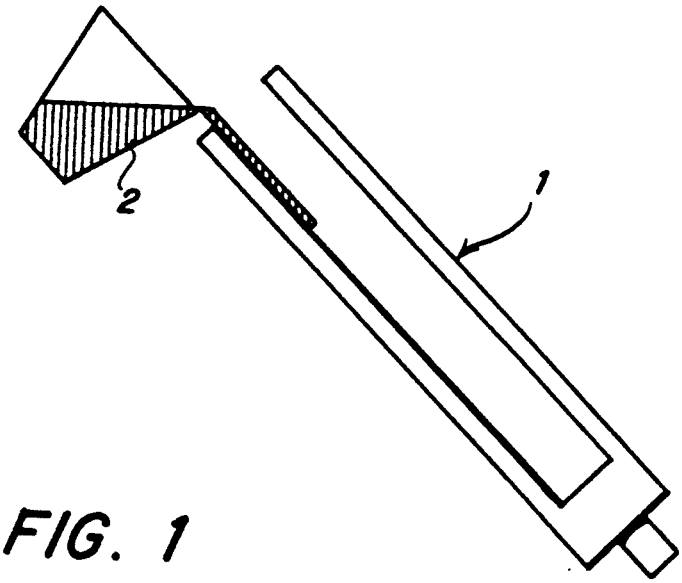
FIG. 1 is a schematic illustration of core fabrication.

FIG. 1 shows schematically the production of the core glass rod. A thermally-conductive, generally cylindrical mold 1 is provided having an open end for receiving molten glass 2, and a closed bottom portion. A thermally-conductive mold is meant to refer to a mold which allows heat transfer with sufficient quickness to prevent crystallization of the molten material poured into the mold when it solidifies. The mold must also be substantially chemically inert with the glass. For fluoride glasses, one could use brass, copper, or aluminum molds, preferably, but not necessarily, gold coated or platinum coated to minimize even trace chemical reaction between the mold and glass melt. The bottom portion of the mold 1 may be provided with a support for holding the mold 1.

In forming the glass core rod, the mold 1 is heated to a temperature below the glass transition temperature of the material to be poured into the mold. The particular preheating temperature is chosen to maximize heat transfer from the core to the mold, so as to prevent glass crystallization, without causing thermal shock to the core, and the concomitant risk of shattering it. Thus the particular preheat temperatures will vary depending on the glass used. For fluoride glasses, a typical range of preheating temperatures would be 50° C. to 100° C. below the glass's transition temperature. Although the glass transition temperature of fluoride glasses can vary as much as between 250° C. to 375° C., nominal preheating temperature for a typical fluoride glass will be between 200° C. and 250° C. To produce a molten fluoride glass, the glass should be heated to about 200° C. to about 300° C. above the glass transition temperature. This ensures sufficiently low viscosity for mixing, without volatilization.

The heated mold can be fitted with a vacuum line or alternatively placed in a vacuum box. A vacuum is desirable to help remove dissolved gasses from the glass as the molten glass is poured into the mold. To assist in the elimination of bubble formation in the glass, the mold may be revolved about the bore center line axis (length) of the mold at a speed to ensure that the melt remains dimensionally uniform, but not so rapid that the melt will fly out of the mold. This can be from about 10 rpm to about 100 rpm. The mold may also be held at an angle between horizontal and vertical as the molten glass is poured into the mold, as shown in FIG. 1, to reduce cavitation. The support at the bottom portion of the mold 1 can be used to hold the mold in any desired position, as well as to rotate the mold.

The diameter of the rod is preferably as large as will permit cooling below the glass's critical cooling rate (i.e. the rate below which glass crystallization will not occur), for fluoride glasses about 5° C. per minute. The length of the mold, however, may be longer than the desired length of the core rod. For fluoride glasses, the inner diameter of mold 1, i.e. the desired diameter of the core rod, may range from about 5 mm to about 50 mm, and preferably ranges from about 10 mm to about 25 mm. The length of the mold can range from about 2 cm to about 50 cm (the latter being what is believed to be the upper limit of today's technology), and preferably range from about 5 cm to about 20 cm. Such mold lengths permit the production of core rods having a length from about 1 cm to about 4 cm.

Any suitable core glass material may be used in the first step of the process, examples of which include the ZBLANs, discussed above.

Forming the core glass rod in a mold described above facilitates the removal of heat from the molten glass. This process permits large preforms to be made. As the molten glass cools below the glass transition temperature, a fluoride glass core rod 3 (shown in FIG. 2) is formed. This fluoride glass core rod is removed from the mold and then overcoated with fluoride cladding glass.

Figure 2:
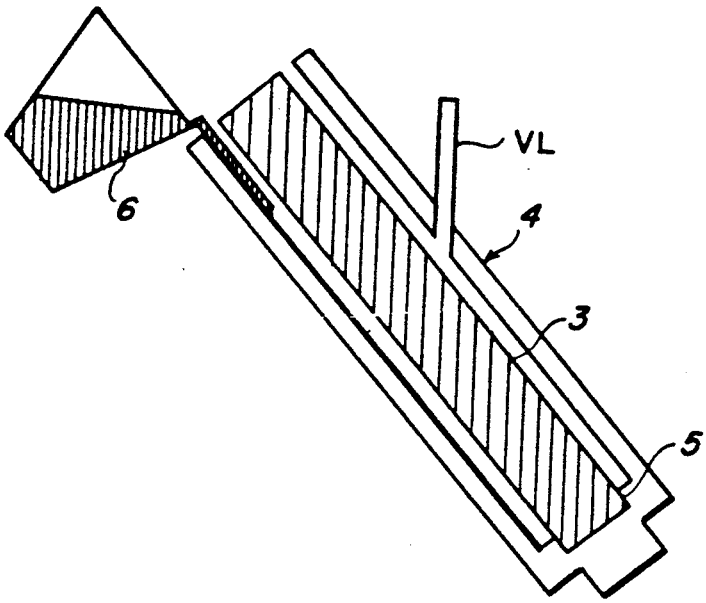
FIG. 2 is a schematic illustration showing clad fabrication.

The overcoating of the fluoride glass core rod with fluoride cladding glass is shown schematically in FIG. 2. The fluoride glass core rod 3 is centered in a second mold 4. The second mold 4 is similar to the first mold 1 except that the second mold has a larger diameter to allow formation of the overcoat. The mold 4 may be provided with a positioning stand 5 for centering the fluoride glass core rod.

The inner diameter of the second mold is nominally 10 mm to about 10 mm larger than the inner diameter of first mold. This allows for a thickness of the cladding glass overcoating which is the difference in diameters between the first and second molds. This thickness should be sufficient to ensure total internal reflection within the optical fiber. Thus, the thickness of the cladding glass overcoating can range from about 2.5 mm to about 25 mm, although the thickness should be able to go as high as 50 mm and still flex. The length of the second mold may be the same or slightly larger than the length of the first mold.

Any suitable cladding glass material may be used for the clad overcoating. Any material which does not react with the core glass, and has a similar coefficient of thermal expansion is suitable, and may be, for example: phosphate glass, fluoride glass, or fluorophosphate glass. The overclad is most preferably a fluoride glass and is heated to a temperature of about 200° C. to about 300° C. above its glass transition temperature to produce a molten glass. The mold 4 is heated to a temperature below the glass transition temperature of the cladding glass, preferably about 50° C. to about 100° C. below, typically about 200° C. to about 250° C. Molten cladding glass material 6 is poured into the heated mold 4.

Figure 3:
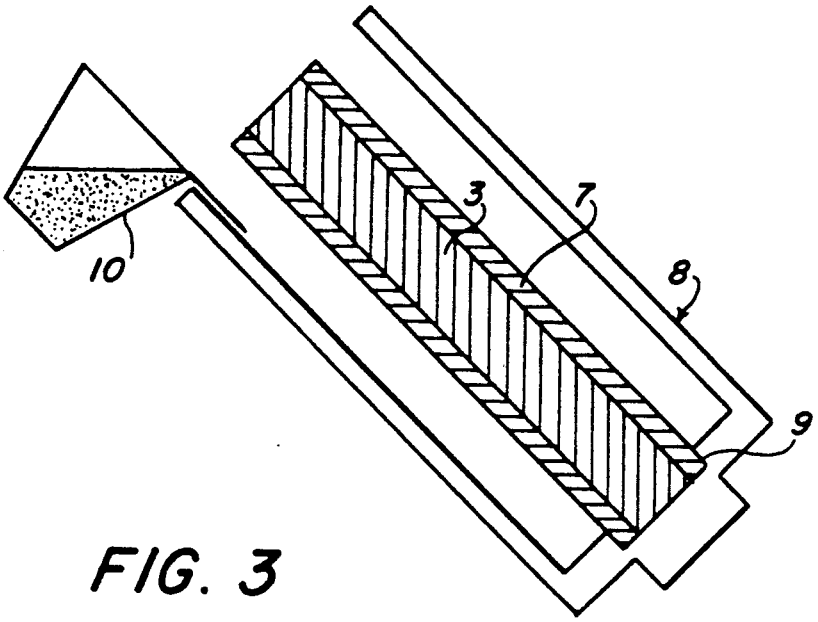
FIG. 3 is a schematic illustration showing overclad fabrication.

As with the process for forming the fluoride glass core rod, the mold may be provided with a vacuum or be placed within a vacuum box. A vacuum line VL is shown in FIG. 2. The mold 4 also may be held at an angle of incline and may be rotated slowly nominally 10 to 100 rpm to assist in eliminating bubbles and crystals. When the molten cladding glass 6 cools below its glass transition temperature, a core/clad fluoride glass unit 7 (shown in FIG. 3) is obtained.

The core/clad unit 3, 7 can be drawn into optical fiber in this form, but preferably it is first provided with a protective overclad. For this purpose, the solidified core/clad fluoride glass unit 7 is removed from the mold 4 and placed in a third mold 8. The third mold 8 is similar to the second mold 4 except that a larger diameter is provided to permit formation of the overclad coating. The mold 8 may also be provided with a positioning stand 9 for centering the core/clad fluoride glass unit.

Appropriate material for the overclad is any that has a coefficient of thermal expansion close to that of the core/clad unit, is chemically compatible with clad 7, and preferably water resistant, flexible, and durable. The overclad should have a transition temperature near to that of the core/clad material roughly within 20° C. to 30° C., to permit efficient heat transfer during fiber draw. For the fluoride glasses discussed above, a simple oxide glass overclad material is appropriate. The constraints on the thickness of the overclad are as above for the clad and core: as thick as possible to still permit cooling of the overclad material at (or above) its critical cooling rate. The inner diameter of 8 can nominally range from about 5 mm to about 25 mm larger than the inner diameter of the second mold 4. This permits an overclad having a nominal thickness of about 2.5 mm to about 12.5 mm. The length of the third mold may be the same or slightly larger than that of the second mold.

The oxide glass is heated to a temperature of about 200° C. to about 300° C. above its glass transition temperature to produce a melt. Again, this temperature range encourages mixing of the overclad glass without causing volatilization. The mold 8 is heated to a temperature approximately 50° C. to about 100° C. below the glass transition temperature of glass 10. Molten glass 10 is then poured into the heated mold to form the overclad. The mold 8 is provided with an adjustable optimum vacuum or provided within a vacuum box. Similarly, the mold 8 may be provided at an angle of incline and has the capacity for rotation.

After the overclad glass has solidified, the unit is then annealed. The annealing is done preferably at slightly below the lowest transition temperature of the glasses in the preform unit. The anneal time will vary according to the size of the unit, for the materials and preform sizes mentioned above, between 2 and 20 hours would be appropriate.

Figure 4:
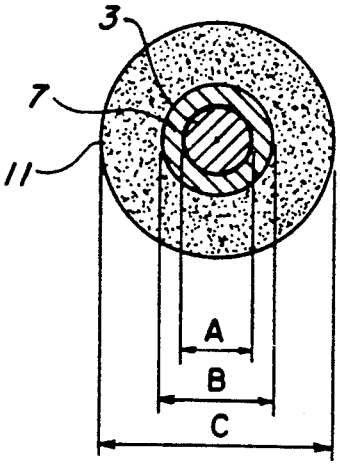
FIG. 4 is a cross-sectional view of a preform according to an embodiment of the invention.

The resulting preform is shown schematically in FIG. 4, in which A, B and C indicate the diameters of the respective first, second and third molds.

Finally, the preform is coated with any one of a number of well known polymers to further protect the preform.

The resultant preform may then be drawn into a fiber having an outer diameter from about 100 to about 200 micrometers and a potential length of about 5 to about 10 kilometers or longer.

The invention will further be illustrated in the following, non-limitive example, it being understood that this example is intended to be illustrative only and that the invention is not intended to be limited to the materials, conditions, process parameters and the like recited herein.

Fluorides of Zr, Ba, La, Al and Na (ZBLAN) were melted in a 30 cc platinum crucible at 880° C. for 2 hours. In particular, the melt consisted of 53 mole percent or $ZrF_4$, 20 mole percent of BaF, 4 mole percent of LaF, 3 mole percent of AlF, and 20 mole percent of NaF. The melt was then lowered to 650° C. for one hour for fining of any bubbles in the melt. The entire melting furnace and glass casting procedure was done inside a dry box (<1 ppm $H_2O$), in an atmosphere of 10% oxygen in nitrogen. After fining the ZBLAN glass, it was cooled to a temperature of 500° C. and cast into an aluminum mold 6 mm in diameter which was preheated to 245° C. The mold was then slowly cooled to room temperature at a rate of 2° C. per minute. The resultant ZBLAN rod 6 mm o.d.×12 cm long was next removed from the mold and annealed at 250° C. for 2 hours.

The annealed ZBLAN rod was then placed in a second aluminum mold 10 mm in diameter which had a 6 mm hole bored into the bottom to support and align the rod. A second glass melt was prepared, having a composition similar to the ZBLAN rod, differing only by the replacement of 50 mole percent $ZrF_4$ with $H_fF_4$. This glass was melted the same way as the ZBLAN glass. Twenty minutes before the cladding glass was cast, the mold containing the ZBLAN rod was heated to 220° C. The cladding glass was cast from 58° C. around the Z BLAN rod while the mold was rotated at 10 rpm. After casting the cladding glass, the mold was slowly cooled to room temperature at a rate of 2° C. per minute. The resultant preform 10 mm o.d.×12 cm long was next removed from the mold and annealed at 250° C. for 2 hours.

After annealing, the preform was mounted on a fiber draw tower and drawn into fiber 130 μm o.d. in an atmosphere of dry helium (<1 ppm $H_2O$). The fiber was then coated with a UV curable polymer coating and spooled. From the preform of the cited dimensions more than 100 meters of optical fiber were drawn.

While the invention has been described with reference to particular preferred embodiments, the invention is not limited to the specific examples given, and other embodiments and modifications can be made by those skilled in the art without departing from the spirit and scope of the invention.

What is claimed is:

1. A process for producing a glass preform, comprising:

forming a glass core rod;

overcoating said glass core rod with a cladding glass to form a core/clad unit by pouring molten cladding glass into a cladding mold containing said glass core rod;

removing said core/clad unit from said cladding mold; and overcoating said core/clad unit with a jacketing glass overclad by pouring molten overcladding glass into a jacketing mold containing said core/clad unit, to form said glass preform.

2. The process of claim 1, wherein molten glass is poured into a heated core rod mold to form said glass core rod.

3. The process of claim 2, wherein said core rod mold is rotated about its bore center line axis as said core rod is formed.

4. The process of claim 2, wherein said core rod mold is provided under a vacuum.

5. The process of claim 2, wherein said core rod mold is heated to a temperature of about 50° C. to about 100° C. below a glass transition temperature of said glass of said core rod.

6. The process of claim 2, wherein said core rod mold is held at an angle between and excluding horizontal and vertical, and rotated about its bore center line axis as said core is formed.

7. The process of claim 1, wherein said glass core rod is formed under a vacuum by pouring molten glass into a core rod mold heated to a temperature below the glass transition temperature of said glass, said core rod mold being rotated about its bore center line axis and being held at an angle between and excluding vertical and horizontal.

8. The process of claim 1, wherein said cladding mold is heated when said molten cladding glass is poured into said cladding mold.

9. The process of claim 8, wherein said cladding mold is rotated about its bore center line axis as said core/clad unit is formed.

10. The process of claim 8, wherein said cladding mold is heated to a temperature of about 50° C. to about 100° C. below a glass transition temperature of said cladding glass.

11. The process of claim 8, wherein said cladding mold is held at an angle between and excluding horizontal and vertical, and rotated about its bore center line axis as said core/clad unit is formed.

12. The process of claim 8, wherein said cladding mold is provided under a vacuum.

13. The process of claim 1, wherein said glass core rod is centered in said cladding mold, said cladding mold being provided under a vacuum and heated to a temperature below the glass transition temperature of said cladding glass and being rotated about its bore center line axis at an angle between and excluding vertical and horizontal.

14. The process of claim 1, wherein said molten overcladding glass is an oxide cladding glass, said jacketing mold is heated, and said glass preform is annealed.

15. The process of claim 14, wherein said jacketing mold is rotated about its bore center line axis as said preform is formed.

16. The process of claim 14, wherein said jacketing mold is provided under a vacuum.

17. The process of claim 14, wherein said jacketing mold is heated to a temperature of about 50° C. to about 100° C. below a glass transition temperature of said oxide cladding glass.

18. The process of claim 14, wherein said jacketing mold is held at an angle between and excluding horizontal and vertical, and rotated about its bore center line axis as said preform is formed.

19. The process of claim 1, wherein said jacketing glass overclad is an oxide cladding glass, said jacketing mold is provided under a vacuum and heated to a temperature below the glass transition temperature of said oxide cladding glass, said core/clad unit being supported within said jacketing mold, said jacketing mold being rotated about its bore center line axis and held at an angle between and excluding vertical and horizontal.

20. A glass preform produced by the process according to claim 1.

21. The process of claim 1, wherein said core rod is of fluoride glass, said cladding glass is of fluoride glass, and said jacketing glass overclad is of oxide glass.

22. A process for producing a fluoride glass preform for making an optical fiber comprising:

pouring molten fluoride glass under vacuum into a first mold heated to a temperature below a glass transition temperature of said fluoride glass;

forming a fluoride glass core rod from said molten fluoride glass;

centering said fluoride glass core rod in a second mold;

pouring a molten cladding glass under vacuum into said second mold, said second mold being heated to a temperature below a glass transition temperature of said cladding glass, to form a core/clad fluoride unit;

centering said core/clad fluoride glass unit in a third mold;

pouring an oxide cladding glass into said third mold, said third mold being heated to a temperature below a glass transition temperature of the oxide cladding glass, to form said preform; and annealing the preform.

23. The process of claim 22, wherein said first mold is held at an angle between and excluding horizontal and vertical and is rotated about its bore center line axis as said molten fluoride glass is poured.

24. The process of claim 22, wherein said second mold is held at an angle between and excluding horizontal and vertical and is rotated about its bore centerline axis as said cladding glass is poured.

25. The process of claim 22, wherein said third mold is held at an angle between and excluding horizontal and vertical and is rotated about its bore center line axis as said oxide cladding glass is poured.

26. The process of claim 22, wherein said first mold is heated to a temperature of about 50° C. to about 100° C. below a glass transition temperature of said fluoride glass.

27. The process of claim 22, wherein said second mold is heated to a temperature of about 50° C. to about 100° C. below a glass transition temperature of said cladding glass.

28. The process of claim 22, wherein said third mold is heated to a temperature of about 50° C. to about 100° C. below a glass transition temperature of said oxide glass overclad.

29. A fluoride glass preform produced by the process according to claim 22.

30. A method for producing a preform from which an optical fiber can be drawn, said preform comprising a core and a cladding about said core, said method comprising steps for:

pouring molten glass into a first mold to form said core;

placing said core within a second mold having an inner diameter larger than that of the outer diameter of said core;

pouring molten glass into said second mold under a vacuum to form a cladding on said core.

31. The method of claim 30, further comprising:

placing said core and said cladding into a third mold having an inner diameter larger than the outer diameter of said core and said cladding;

pouring molten jacketing material into said third mold to form an overlcad on said cladding.

32. A process for producing a glass preform, comprising:

forming a glass core rod;

overcoating said glass core rod with a cladding glass to form a core/clad unit by pouring molten cladding glass into a cladding mold containing said glass core rod;

removing said core/clad unit from said cladding mold; and overcoating said core/clad unit with a jacketing glass overclad by pouring molten overcladding glass into a jacketing mold containing said core/clad unit to form said glass preform.

* * * * *